US012330050B2

(12) United States Patent
Yadav et al.

(10) Patent No.: US 12,330,050 B2
(45) Date of Patent: Jun. 17, 2025

(54) AUTOMATIC INSTANTIATION OF NATIVE VIRTUAL INTERFACES FOR STREAMING APPLICATIONS

(71) Applicant: NVIDIA Corporation, Santa Clara, CA (US)

(72) Inventors: Prakash Yadav, Maharashtra (IN); Charu Kalani, Bothell, WA (US); Stephen Holmes, Fort Collins, CO (US); David Wilson, Liberty Hill, TX (US); David Le Tacon, Jonestown, TX (US); James Lewis van Welzen, Sandy, UT (US)

(73) Assignee: NVIDIA Corporation, Santa Clara, CA (US)

( * ) Notice: Subject to any disclaimer, the term of this patent is extended or adjusted under 35 U.S.C. 154(b) by 340 days.

(21) Appl. No.: 17/948,892

(22) Filed: Sep. 20, 2022

(65) Prior Publication Data

US 2023/0121413 A1    Apr. 20, 2023

Related U.S. Application Data

(60) Provisional application No. 63/255,864, filed on Oct. 14, 2021.

(51) Int. Cl.
*A63F 13/235*    (2014.01)
*A63F 13/335*    (2014.01)
*A63F 13/355*    (2014.01)

(52) U.S. Cl.
CPC .......... *A63F 13/235* (2014.09); *A63F 13/335* (2014.09); *A63F 13/355* (2014.09); *A63F 2300/538* (2013.01)

(58) Field of Classification Search
CPC .... A63F 13/235; A63F 13/335; A63F 13/355; A63F 2300/538; A63F 13/533; A63F 13/87; A63F 13/92

(Continued)

(56) References Cited

U.S. PATENT DOCUMENTS 11,413,547 B2 *   8/2022  Benedetto ........... A63F 13/5252
2016/0080451 A1   3/2016  Morton et al.
(Continued)

FOREIGN PATENT DOCUMENTS

WO    2021042134 A1    3/2021
WO    2023064073 A1    4/2023

OTHER PUBLICATIONS

International Search Report and Written Opinion for International Application No. PCT/US2022/044231, filed Sep. 21, 2022, mailed Jan. 3, 2023, 11 pgs.

(Continued)

*Primary Examiner* — Pierre E Elisca

(74) *Attorney, Agent, or Firm* — Taylor English Duma L.L.P.

(57) ABSTRACT

In examples, a device's native input interface (e.g., a soft keyboard) may be invoked using interaction areas associated with image frames from an application, such as a game. An area of an image frame(s) from a streamed game video may be designated (e.g., by the game and/or a game server) as an interaction area. When an input event associated with the interaction area is detected, an instruction may be issued to the client device to invoke a user interface (e.g., a soft keyboard) of the client device and may cause the client device to present a graphical input interface. Inputs made to the presented graphical input interface may be accessed by the game streaming client and provided to the game instance.

20 Claims, 7 Drawing Sheets

(58) Field of Classification Search
USPC .......................................................... 463/42
See application file for complete search history.

(56) References Cited

U.S. PATENT DOCUMENTS

| | | | |
|---|---|---|---|
| 2020/0269143 A1* | 8/2020 | Benedetto ............. | A63F 13/537 |
| 2021/0089780 A1* | 3/2021 | Chang .................... | A63F 13/60 |
| 2022/0395756 A1* | 12/2022 | Benedetto ............. | A63F 13/822 |

OTHER PUBLICATIONS

Yadav, Prakash; International Preliminary Report on Patentability for PCT Application No. PCT/US2022/044231, filed Sep. 21, 2022, mailed Apr. 25, 2024, 8 pgs.

* cited by examiner

AUTOMATIC INSTANTIATION OF NATIVE VIRTUAL INTERFACES FOR STREAMING APPLICATIONS

CROSS-REFERENCE TO RELATED APPLICATIONS

This application claims the benefit of U.S. Provisional Application No. 63/255,864, filed on Oct. 14, 2021, which is hereby incorporated by reference in its entirety.

BACKGROUND

Game streaming services allow a player to interact with an instance of a game running on a server through an interface executing on a client device. A game streamed from a game server may execute and continue processing and rendering for a game application locally, while transmitting (via a streaming service platform) the rendered video, audio, and/or other game data to a remote client device for presentation of the game. A user may provide inputs to the client device that are transmitted to the game server and used to interact with the game. Since the instance of the game is running in a game server, the game may be streamed to a client device for which the game was not designed, which may cause a diminished user experience since different client devices may rely on different input interfaces. For example, desktop games are often not designed for mobile or tablet devices, which often lack a physical keyboard and mouse. Thus, some client devices may use a touch screen and a software-based "soft" or "virtual" keyboard that appears over a portion of the display screen to provide input interfaces to a user in place of a physical keyboard. Because a soft keyboard is displayed on the screen of the device—either as an overlay on top of (e.g., obscuring), or otherwise impacting (e.g., by condensing) the visualization of other graphical data from the application or game—it may be necessary for the soft keyboard interface to be activated and deactivated by the user as needed.

Conventional methods for invoking the native input interfaces of a client device do not enable the activation and deactivation of native input methods of the client device using interactions with the game interface itself, but instead rely on supplemental widgets or menus. For example, activating an application specific soft keyboard on a client device may require an additional widget or application that operates concurrently with a game that allows a user to invoke (e.g., instantiate) the keyboard by selecting it from a menu or command. Since these operations require additional steps and are not performed within the main interface or display of the game, it creates a cumbersome and inefficient user interface.

SUMMARY

Embodiments of the present disclosure relate to approaches for automatic instantiation of native virtual interfaces for streaming applications. Systems and methods are disclosed that may be used to detect input events associated with one or more interaction areas of one or more image frames of a streamed game and cause a client device to display a graphical input interface that is native to the client device.

In contrast to conventional approaches, the present disclosure provides for automatic invocation of a device's native input interface (e.g., a soft keyboard) using interaction areas associated with image frames from an application, such as a game. The native input interface may be activated by interacting with particular portions of the image frames from a video stream of application output. For example, an area of an image frame from a streamed game video may be designated (e.g., by the game and/or a game server) as an interaction area (e.g., corresponding to a character entry field, number entry field, finger or stylus interaction field, etc.). When an input event (e.g., mouse click, touch event, selection, activation, etc.) associated with the interaction area is detected, an instruction may be issued to the client device to invoke a user interface (e.g., a soft keyboard) of the client device (e.g., smartphone, smart television, tablet computer, etc.) and may cause the client device to present a graphical input interface (e.g., a soft keyboard, software text entry, number pad, etc.). Inputs (e.g., entered text) made to the presented graphical input interface may be accessed by the game streaming client and provided to the game instance. By invoking the native input interface of a client device, a user may interact with a game streaming application in a manner similar to other applications on the client device, thus a more familiar, natural, and intuitive experience may be provided using fewer user interactions.

BRIEF DESCRIPTION OF THE DRAWINGS

The present systems and methods for automatic instantiation of native virtual interfaces for streaming applications are described in detail below with reference to the attached drawing figures, wherein.

DETAILED DESCRIPTION

Figure 1:
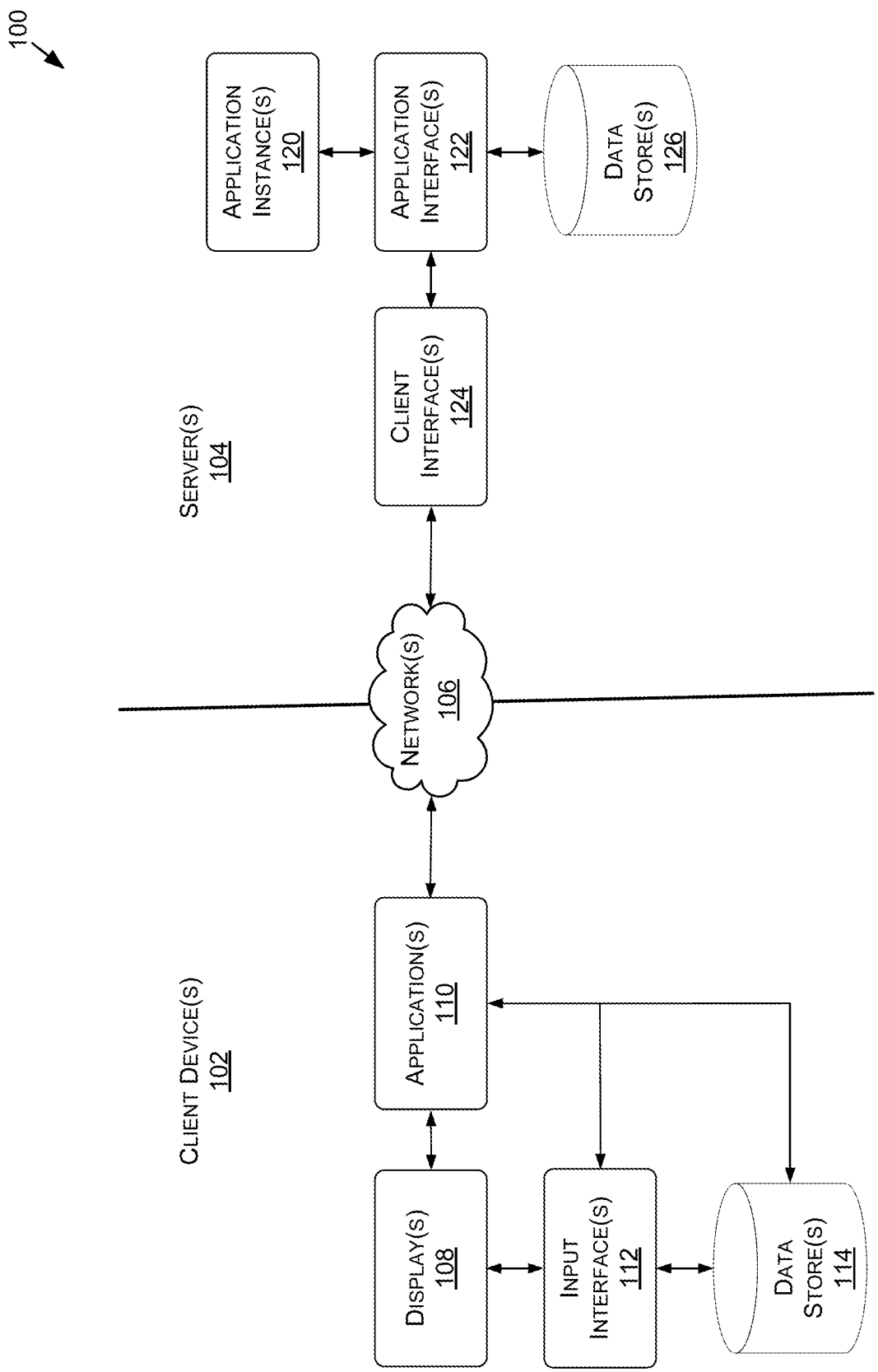
FIG. 1 depicts an example of an application streaming system, in accordance with some embodiments of the present disclosure.

Systems and methods are disclosed related to automatic instantiation of native virtual interfaces for streaming applications. The disclosure provides, in part, approaches for invoking an input interface of a device by detecting input events in relation of image frames of game stream video.

In one or more embodiments, an input interface of a particular device may be provided based at least on interactions with regions of video output generated by a software application (e.g., a video game or gaming application). For example, a touch-screen keyboard native to a tablet computer may be provided and used to detect text entry input for use within a game streaming system, thus allowing for a familiar and uniform interface of the tablet computer to be used to interact with a game.

In one or more embodiments, video data associated with a game stream may be received by a client device (e.g., a computer, a smartphone, a smart television, etc.). For example, a game stream may be received in a game streaming application on the client device. The game stream may be received from one or more game servers on which an instance of a game may be running within a game session. The game stream, from the one or more game servers, may include one or more frames of video data and/or other game data associated with one or more games. The game data may indicate and/or specify one or more interaction areas (e.g., in-game text input regions) that correspond to a region(s) or portion(s) of the video data and may be configured to enable an input or interaction that causes presentation and/or instantiation of an input interface. For example, an interaction area may correspond to a text entry field and/or a number entry field in a game and/or a region(s) in the video data designated for input to the field(s) within the game. In one or more embodiments, the interaction areas and associated parameters may be defined in the game data associated with a game and/or game application (e.g., by the game itself and/or the game server). For example, the interaction area may be represented in game data transmitted from game servers to one or more client devices. The data corresponding to the one or more interaction areas may indicate a position of the interaction area(s) within the video data of a game, an input type parameter, an input event parameter, an interaction area state, and/or other parameters.

In one or more embodiments, interaction area state information may be included in data—corresponding to one or more interaction areas—that indicates whether a particular interaction area is in an active or inactive state within a game session. When an interaction area is in an active state, the interaction area may be monitored for input events (e.g., a touch event). For example, the position of a detected input event may be compared to a position for an interaction area indicated by game data. In one or more embodiments, the interaction area state information may be stored on one or more game servers and may be transmitted to one or more client devices. For example, the interaction area state information indicating that an interaction area is in an active state may be stored in one or more data stores on one or more game servers and transmitted to one or more client devices over a network. The interaction area state information may be transmitted in response to the corresponding interaction area being displayed on a client device. For example, when a text entry field is or is to be displayed on a client device, the interaction area state may be transmitted to the client device by a game server. Additionally, or alternatively, the interaction area state information may be transmitted in response to an indication that a client device has connected to a game session. For example, if a first client device is connected to a game session and a user subsequently reconnects to the same game session using a second client device, the interaction area state information may be re-sent by the game server to the second client device such that the second client device will be aware of the active interaction areas.

In one or more embodiments, a client device may detect an input event in relation to one or more interaction areas depicted in the video stream. For example, the client device may detect an input that selects a text entry field in a game. Detecting an input event may select, or otherwise activate, the interaction area. An interaction area may be associated with one or more input type parameters that may be used to determine the possible actions that may be performed (e.g., by the client device) in response to detecting an input event in relation to an interaction area. For example, an interaction area may be associated with an input type parameter that indicates that an alphabetical software keyboard should be invoked. In one or more embodiments, the input type parameter may specify a particular input interface and/or input interface configuration associated with an interaction area. For example, the input type parameter may specify an interface suitable for numerical text entry or text entry of a URL or email address.

In one or more embodiments, an interaction area may be associated with any of a number of input events. In one or more embodiments, particular input events may correspond with various actions that may be taken in association with the interaction area. For example, an input event may comprise particular methods of interacting with an interaction area such as a touch screen event (e.g., tapping a touch screen interface). In some examples, the input event may be a long-press action. The interaction area may be configured to respond to a long-press input event (e.g., on a touch screen) by allowing text to be pasted into an entry field, performing special actions such as accessing context menus, and/or performing any other desired action. In one or more embodiments, an interaction area may be associated with a parameter that indicates how a particular input event should be handled (e.g., by the client device). For example, a parameter may be configured for a particular text entry field to indicate a text-based paste operation should be performed upon receiving a long-press action and a different operation should be performed on a short-press action. As another example, a parameter may indicate whether an input event(s) or type of input event should cause a client device to perform some location action or to forward the input event(s) or type of input event to the game for the game to perform some action, such as to bring up a context menu.

Input events may be detected in relation to one or more interaction areas. In one or more embodiments, the client device may continuously monitor or poll the one or more interaction areas to detect the various input events. For example, the interaction areas may be monitored to detect a "touch" input made to the corresponding region of a touch screen interface of a client device.

In one or more embodiments, based at least on detecting an input event associated with an interaction area, an instruction may be issued by an application programming interface (API) and/or other interface of the client device causing the client device to activate and/or present a graphical input interface such as a soft keyboard. For example, a user interface operating on a smartphone may issue an instruction to an API of the smartphone causing the smartphone to present the onscreen keyboard allowing text to be entered using the native input interface of the smartphone. In one or more embodiments, the display of the game may be modified in response to the onscreen keyboard being presented. For example, the game streaming application and/or a client application may scale, shift, pan, and/or modify a display of the game video stream such that the display and/or the active interaction area is not occluded by the presented onscreen keyboard.

In one or more embodiments, the onscreen keyboard may accept one or more inputs (e.g., typed text, typed symbols, etc.). Upon accepting inputs to the onscreen keyboard, the inputs may be provided to the client device and may be transmitted to one or more game servers as input to a game. In one or more embodiments, the input from an input interface may be transmitted via a network to an instance of a game running on a game server. The inputs may be transmitted to the game instance to control aspects of the game. In one or more embodiments, the onscreen keyboard may be destructed and/or deactivated. For example, once an onscreen keyboard has been presented, an input to a user interface of a device outside of the onscreen keyboard may cause the keyboard to be dismissed or otherwise not be visible.

While games are primarily provided herein as examples, aspects of the present disclosure may be used in conjunction with any suitable form of application or software, such as desktop applications, application programs, operating system software, etc.

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

FIG. 1 depicts an example of an application streaming system 100 (also referred to herein as "system 100"), in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The system 100 may be implemented using, among other components, one or more client devices, such as a client device(s) 102 and one or more servers, such as a server(s) 104, which may communicate over one or more networks, such as a network(s) 106. A client device 102 may include, for example, one or more displays, such as a display(s) 108, one or more applications, such as an application(s) 110, one or more native input interfaces, such as an input interface(s) 112, and one or more data stores, such as a data store(s) 114. Although only a few components and/or features of the client device 102 are illustrated in FIG. 1, this is not intended to be limiting. For example, a client device 102 may include additional or alternative components, such as those described below with respect to the computing device 600 of FIG. 6 and/or the client device 504 of FIG. 5.

A server 104 may include, for example, one or more application instances, such as an application instance(s) 120, one or more application interfaces, such as an application interface(s) 122, one or more client interfaces, such as a client interface(s) 124, and one or more data stores, such as a data store(s) 126. Although only a few components and/or features of the server(s) 104 is illustrated in FIG. 1, this is not intended to be limiting. For example, the server(s) 104 may include additional or alternative components, such as those described below with respect to the computing device 600 of FIG. 6 and/or the application server 502 of FIG. 5.

As an overview, the server(s) 104 may be configured to execute the application instance 120, such as a game instance. The application interface 122 of the server 104 may be configured to provide an interface between the application instance 120, the data store 126, and the client interface 124, for example, to facilitate the server 104 executing the application instance 120, to facilitate the capture of video capturing output from the application instance 120, and to facilitate one or more communications between the client device 102 and the application instance 120 (e.g., providing application data to the client device 102, applying input data from the client device 102 to the application instance 120, etc.).

The client interface 124 of the server 104 may be configured to provide an interface between the application interface 122 and the client device 102 over the network 106. In at least one embodiment, the client interface 124 may be configured to receive application data (e.g., game data) corresponding to the application instance 120 from the application interface 122—such as video data (e.g., of a video stream), designations of one or more interaction areas, and/or interaction area state information associated with the one or more interaction areas—and transmit the data (e.g., stream at least the video data) to the client device 102. The client interface 124 may further be configured to receive input data (e.g., user input data) from the client device 102 and provide the input data to the application interface 122 (which may in turn apply the input data to the application instance 120). The data store(s) 126 may be configured to store any of the various information described herein, such as interaction area state information for the application instance(s) 120, one or more application binaries for the application instance(s) 120, configuration information for the application instance(s) 120 and/or the application(s) 110, etc.

The application(s) 110 of the client device(s) 102 may be configured to provide an interface between the client device(s) 102, and the client interface(s) 124 of the server(s) 104, for example, to cause display of the video data received from the client interface(s) 124 using the display(s) 108, to cause configuration and/or management of the one or more interaction areas indicated in the application data from the client interface(s) 124, to detect one or more input events corresponding to one or more of the interaction areas from input data, etc. The display(s) 108 may be configured to display image frames corresponding to the video data. The input interface(s) 112 may be configured to receive one or more user inputs (e.g., input events) and provide corresponding input data to the application(s) 110. The application(s) 110 of the client device(s) 102 may be configured to monitor or poll the one or more interaction areas using the input data to detect the various input events. The application(s) 110 of the client device(s) 102 may further be configured to cause the input interface(s) 112 to activate and/or present an input interface, such as a soft keyboard, in association with the video data based at least on detecting one or more input events corresponding to an interaction area(s) and may provide input data received from the presented input interface to the client interface 124. The data store(s) 114 may be configured to store any of the various information described herein, such as such as interaction area state information for the application instance(s) 120, one or more application binaries for the application(s) 110, configuration information for the application instance(s) 120, etc.

Components of the system 100 may communicate over network(s) 106. The network(s) 106 may include a wide area network (WAN) (e.g., the Internet, a public switched telephone network (PSTN), etc.), a local area network (LAN) (e.g., Wi-Fi, ZigBee, Z-Wave, Bluetooth, Bluetooth Low Energy (BLE), Ethernet, etc.), a low-power wide-area network (LPWAN) (e.g., LoRaWAN, Sigfox, etc.), a global navigation satellite system (GNSS) network (e.g., the Global Positioning System (GPS)), and/or another network type. In any example, each of the components of the system 100 may communicate with one or more of the other components via one or more of the network(s) 106.

The client device(s) 102 may include a smart phone, a laptop computer, a tablet computer, a desktop computer, a wearable device, a mobile device, a touch-screen device, a game console, a virtual reality system (e.g., a headset, a computer, a game console, remote(s), controller(s), and/or other components), a streaming device, (e.g., an NVIDIA SHIELD), a smart-home device that may include an intelligent personal assistant, and/or another type of device.

The data store(s) 114 may include any of a variety of computer-readable media. The computer-readable media may be any available computer-readable media that can be accessed by the client device 102. The computer-readable media may include volatile and/or nonvolatile media, and removable and/or non-removable media. By way of example, and not limitation, the computer-readable media may comprise computer-storage media and communication media. The data store(s) 114 may include additional or alternative components, such as those described below with respect to the memory 604 of FIG. 6.

An application 110 may include a game and/or video streaming application, and/or another type of application or service. The application 110 may include a mobile application, a computer application, a console application, a tablet application, and/or another type of application. The application 110 may include instructions that, when executed by a processor(s), cause the processor(s) to, without limitation, receive input data representative of user inputs to the one or more input device(s), transmit at least some of the input data to the server(s) 104, retrieve at least a portion of game data from memory and/or the data store 114, receive at least a portion of game data using the client interface(s) 124 of the server(s) 104, and/or cause display of video data corresponding to the application instance 120 on the display 108. In various embodiments, the application(s) 110 may operate as a facilitator for enabling playing of the application instance 120 on the client device(s) 102.

The application 110 and/or patches or updates to the application 110 may be downloaded from the server(s) 104 or may be downloaded from another server(s), such as a server of a content delivery network (CDN). For example, the server(s) 104 may be located in a different country or on a different continent. So as to reduce the download time, the application 110 and/or the patches or updates may be stored on different servers around the globe. As such, when the client device 102 is downloading the application 110 and/or the patches or updates (which may indicate one or more interaction areas and/or corresponding interaction area state information), the client device 102 may connect to a more local server that is part of the CDN, for example.

In one or more embodiments, the application 110 receives display data (e.g., encoded display data, as described with respect to FIG. 5) and uses the display data (e.g., video data) to display image frames corresponding to the application instance 120 on the display 108. In some examples, a first client device may render the game while a second client device, such as a client device 102, may receive the display data and display the game using the display data. In examples where the display data is received by the client device (e.g., where the client device 102 does not generate the rendering), the system 100 may be part of a game streaming system, such as the game streaming system 500 of FIG. 5, described herein. The application 110 may facilitate a plurality of game or application sessions over time. The game sessions may include any number of game sessions participated in by any number of users of the client device(s) 102 for any number of different games.

The display 108 may include any type of display capable of displaying image frames (e.g., a light-emitting diode display (LED), an organic LED display (OLED), a liquid crystal display (LCD), an active matrix OLED display (AMOLED), a quantum dot display (QDD), a plasma display, an LED/LCD display, and/or another type of display). In some examples, the display 108 may include more than one display (e.g., a dual-monitor display for computer gaming, a first display for configuring a game and a virtual reality display for playing the game, etc.). In some examples, the display is a touch-screen display, such as a touch-screen of a smart phone, tablet computer, laptop computer, or the like, where the touch-screen corresponds to at least one of the input interfaces 112 of the client device 102.

Figure 5:
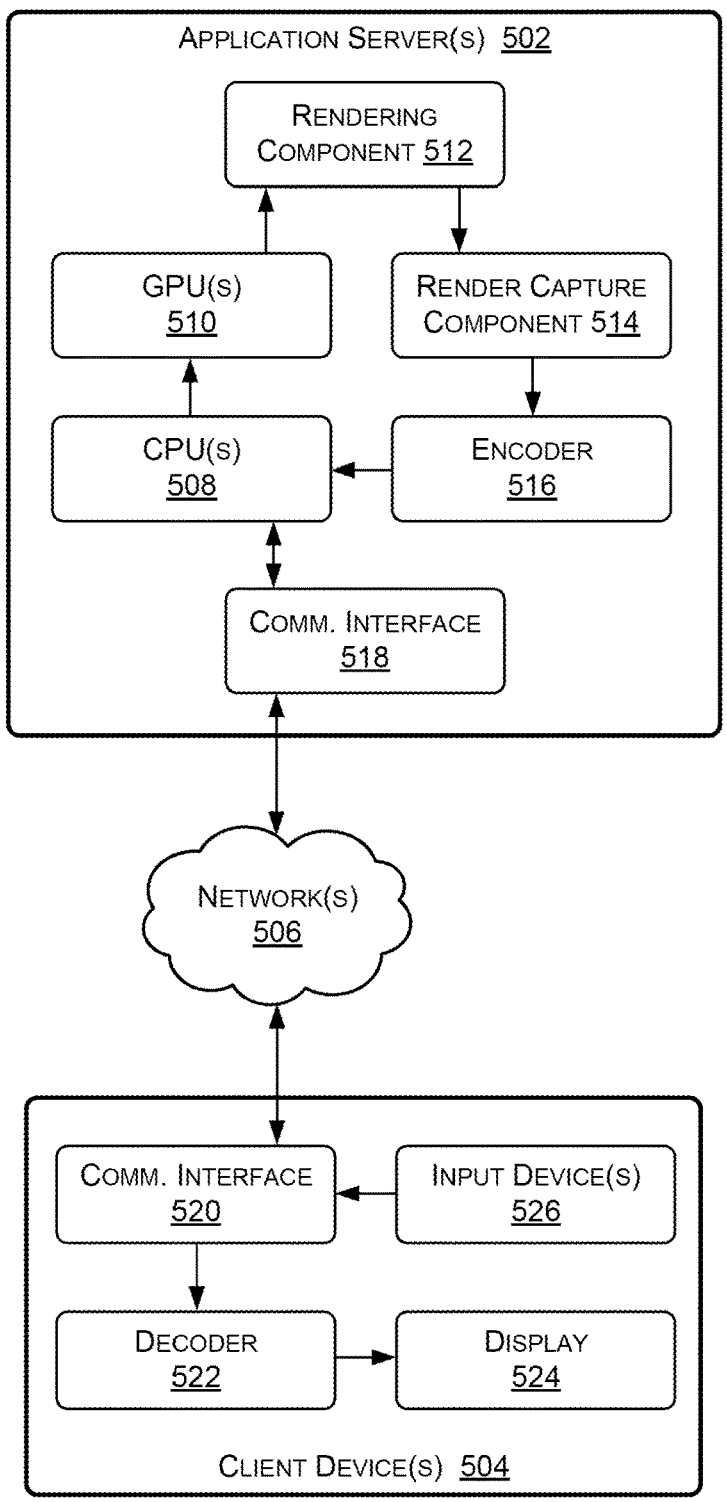
FIG. 5 is a block diagram of an example content streaming system suitable for use in implementing some embodiments of the present disclosure.

The input interfaces(s) 112 may include any type of interfaces that are capable of providing user inputs to the application(s) 110 and/or the application instance(s) 120 using one or more input devices (e.g., the input device(s) 526 of FIG. 5). The input device(s) may include a keyboard, a mouse, a microphone(s), a touch-screen display, a controller(s), a remote(s), a headset (e.g., sensors of a virtual reality headset), and/or other types of input devices. In one or more embodiments, the application(s) 110 may communicate with one or more of the input interfaces 112 using one or more application programming interfaces (APIs). For example, based at least on detecting an input event associated with an interaction area, the application 110 may issue one or more instructions to the API causing the client device 102 to activate and/or present a graphical input interface, such as a soft keyboard. The graphical input interface may include for example, a native input interface and/or a local input interface separate from the application(s) 110. For example, the graphical input interface may include a graphical input interface of an operating system executing on the client device 102. As described herein the application(s) 110 of the client device(s) 102 may be configured to provide an interface between the client device(s) 102, and the client interface(s) 124 of the server(s) 104. According to one or more embodiments, an application 110 may include a game and/or video streaming application, and/or another type of application or service.

Figure 2:
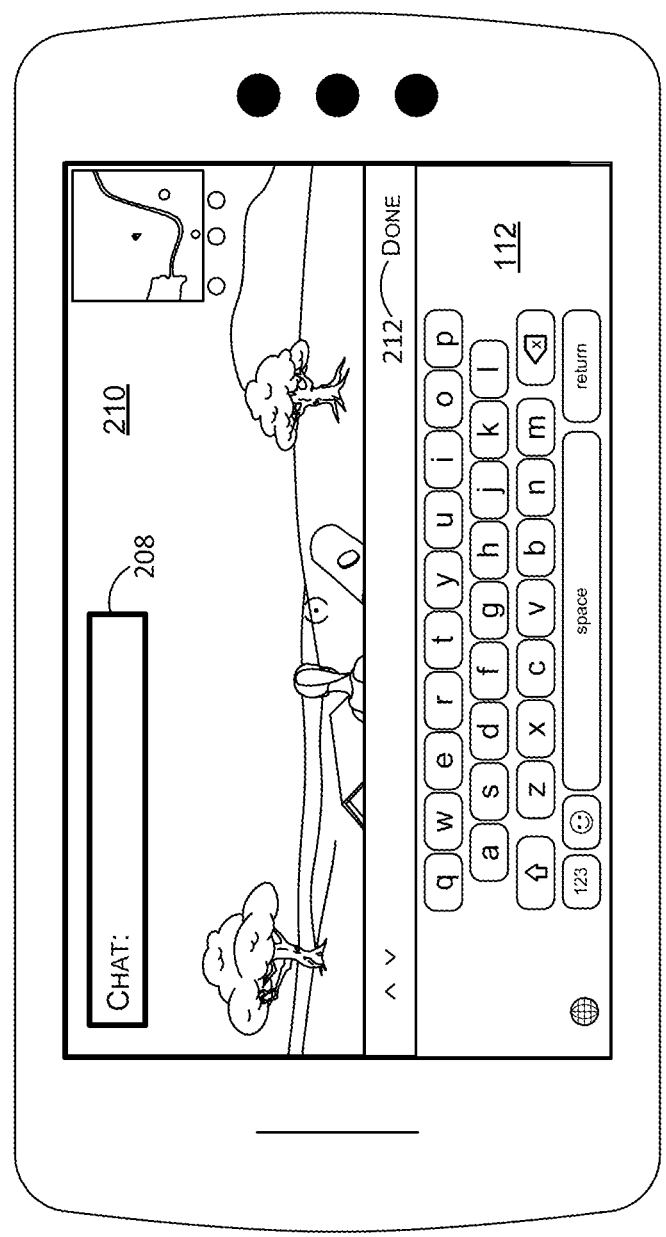
FIG. 2 illustrates an example of an input interface presented based at least on an interaction area corresponding to a region depicted in at least one frame corresponding to an application instance, in accordance with some embodiments of the present disclosure.

Referring now to FIG. 2, FIG. 2 illustrates an example of an input interface 112 presented based at least on an interaction area corresponding to a region 208 depicted in at least one frame 210 corresponding to an application instance 120, in accordance with some embodiments of the present disclosure.

In one or more embodiments, the application 110 may cause presentation of the input interface 112 of the client device 102 based at least on detecting one or more interactions with one or more regions of the frame 210, such as the region 208, based at least on the one or more regions corresponding to one or more interaction areas. Thus, the user may interact with a presentation of the application instance 120 to access the input interface 112, rather than relying on supplemental widgets or menus. In at least one embodiment, the input interface 112 may include a touchscreen keyboard native to the client device 102. In at least one embodiment, the input interface 112 may be used to detect text entry input for use within the application instance 120.

The application 110 may use application data associated with the application instance 120 to facilitate presentation of the application instance 120 using the client device 102 and/or interaction between a user(s) of the client device 102 and the application instance(s) 120. Application data (e.g., game data) may include any combination of data indicating and/or specifying one or more of the interaction areas, one or more input type parameters, one or more input event parameters, one or more interaction area states, video data, and/or other information. In one or more embodiments, at least some of the application data may be provided prior to an application session. In one or more embodiments, at least some of the application data may be provided during an application session. Further, at least some of the application data may or may not be streamed to the application 110 for use in facilitating presentation of the application instance 120 and/or interaction between the user(s) of the client device 102 and the application instance(s) 120. For example, where the system 100 comprises a game streaming system, such as the game streaming system 500 of FIG. 5, video data and/or display data for the application instance 120 may be streamed to the application 110 for display on the display 108.

In one or more embodiments, information corresponding to the one or more interaction areas used by the application(s) 110 may be provided by the server(s) 104, such as using the client interface(s) 124. For example, application data indicating and/or specifying one or more of the interaction areas and/or parameters thereof may be provided to the application 110 in association with an application corresponding to the application instance 120, and/or in association with the application instance 120.

In one or more embodiments, the information may include one or more interaction area identifiers (IDs) corresponding to the one or more action identifiers. The application 110 may use an interaction area ID to track, update, and/or otherwise manage information regarding the one or more interaction areas.

As described herein, the information may specify and/or indicate a position for the interaction area(s) within the video data. For example, the information may specify and/or indicate one or more coordinates for the region(s) corresponding to the interaction area(s), such as the region 208. The coordinates may be defined using any suitable approach, such as with respect to one or more pixel positions, with respect to a resolution and/or aspects ratio of the video data, with respect to one or more particular image frames, etc. In at least one embodiment, the information may specify and/or indicate one or more dimensions and/or shapes of the region(s). As a non-limiting example, the information for the region 208 may include a center location for the region 208, an X-dimension for the region 208, and a Y-dimension for the region 208. In one or more embodiments, a region for an interaction area may have any shape or size. Further, a region(s) for an interaction area and/or one or more characteristics thereof may be updated or change dynamically during presentation of the application instance 120.

Also described herein, the information may specify and/or indicate an input type parameter(s) for one or more interaction areas. As described herein, an input type parameter may specify a particular input interface and/or input interface configuration associated with an interaction area(s). For example, the input type parameter may specify an interface suitable for numerical text entry or text entry of a URL or email address. As a further example, an interaction area may be associated with an input type parameter that indicates that an alphabetical software keyboard should be invoked. The application(s) 110 may, based at least on detecting one or more input events corresponding to one or more interaction areas, cause display of the particular input interface and/or configure the input interface based at least on the input interface configuration. For example, the input type parameter associated with the region 208 may specify the input interfaces 112 shown in FIG. 2 should be invoked in association with the interaction area.

Further described herein, the information may specify and/or indicate an input event parameter(s) for one or more interaction areas. An input event parameter(s) may specify and/or indicate how an input event(s) detected using the application(s) 110 for an interaction area(s) should be handled (e.g., by the client device 102). For example, an input event parameter(s) for a text entry field may indicate and/or specify the application(s) 110 is to perform a text-based paste operation based at least on the input event(s) corresponding to a long-press action. Additionally, or alternatively, an input event parameter(s) may indicate and/or specify the application(s) 110 is to perform a different operation based at least on the input event(s) corresponding to a short-press action. As another example, an input event parameter(s) may indicate and/or specify the application(s) 110 is to perform some local action or is to forward the input event(s) or type of input event (and/or input data) to the application instance 120 for the application instance 120 to perform some action, such as to bring up a context menu.

Further described herein, the information may specify and/or indicate interaction area state information an input event parameter(s) for one or more interaction areas. An action state information may specify and/or indicate to the application(s) 110 whether one or more interaction areas are in an active and/or inactive state. When an interaction area is in an active state, the application(s) 110 may monitor the interaction area for one or more input events (e.g., a touch event) to cause presentation of the input interface(s). When an interaction area is in an inactive state, the application(s) 110 may refrain from monitoring the interaction area for one or more input events to cause presentation of the input interface(s).

At least some of the interaction area state information may be transmitted using the client interface(s) 124 to the client device(s) 102 in response to one or more in-application elements for the corresponding interaction area(s) being displayed on the client device 102 and/or in video data corresponding to the application instance 120. In one or more embodiments, based at least on the application instance 120 and/or the application interface 122 determining a text entry field is or is to be displayed on the client device 102, the application instance 120 and/or the application interface 122 may include corresponding interaction area state in application data transmitted to the client device 102 (e.g., to activate one or more interaction areas). Also in one or more embodiments, based at least on the application instance 120 and/or the application interface 122 determining a text entry field is not or is no longer to be displayed on the client device 102, the application instance 120 and/or the application interface 122 may include corresponding interaction area state in application data transmitted to the client device 102 (e.g., to deactivate one or more interaction areas).

By way of example, the application instance 120 and/or the application interface(s) 122 may determine and/or detect display of the one or more in-application elements and provide corresponding interaction area state information for the application(s) 110 accordingly (e.g., to activate one or more interaction areas). Additionally, or alternatively, the application instance 120 and/or the application interface(s) 122 may determine and/or detect removal from display for the one or more in-application elements and provide corresponding interaction area state information for the application(s) 110 accordingly (e.g., to deactivate one or more interaction areas).

Additionally, or alternatively, the application instance 120 and/or the application interface(s) 122 may determine and/or detect the client device 102 has connected to an application session and provide corresponding interaction area state information for the application(s) 110 accordingly (e.g., to activate or deactivate one or more interaction areas). For example, if the client device 102 is connected to an application session and a user subsequently reconnects to the same application session using a different client device 102, the interaction area state information may be re-sent by the game server to the second client device such that the second client device will be aware of the active interaction areas.

The application(s) 110 may use one or more of the input interfaces 112 to detect one or more input events in relation to one or more interaction areas. In one or more embodiments, the client device 102 and/or the application(s) 110 may continuously monitor or poll for input data to detect the various input events in relation to the one or more interaction areas. For example, the interaction areas may be monitored to detect a "touch" input made to the corresponding region of a touch screen interface of a client device. In one or more embodiments, the application(s) 110 may compare the position of a detected input event to a position for an interaction area indicated by the application data. In the example of FIG. 2, the application(s) 110 may compare the position(s) to one or more positions corresponding to the region 208 to determine whether the detected input event(s) is at least partially within the region 208. Based at least on determining the detected input event(s) is at least partially within the region 208, the application(s) 110 may transmit one or more instructions to the input interface(s) 112 to cause presentation of the input interface(s) 112 on the display(s) 108. Detecting an input event(s) for an interaction area(s) may select, or otherwise activate, a corresponding input interface 112 to cause user input to be provided from the client device 102 to a corresponding user input element within the application instance(s) 120. For example, the application(s) 110 may detect an input event(s) for an interaction area that corresponds to a text entry field in the application instance 120 and the input interface 112 may be used to provide user input to the text entry field(s). In one or more embodiments, an interaction area may be associated with any of a number of input events and/or user input elements (e.g., input fields).

In one or more embodiments, the application(s) 110 may modify the display of the application instance 120 on the client device 102 in response to the input interface 112 being presented on the display 108. For example, the application(s) 110 may scale, shift, pan, and/or modify presentation of the video data corresponding to the application instance(s) 120 such that the frame(s) 210 and/or the region(s) 208 are not occluded by the presented input interface 112.

In one or more embodiments, the input interface(s) 112 may accept one or more inputs (e.g., typed text, typed symbols, etc.). Upon accepting inputs, the inputs may be provided to the application(s) 110, which may transmit the input data to the client interface(s) 124. The client interface(s) 124 may provide the input data to the application interface(s) 122, which may in turn provide the input data to the application instance(s) 120. For example, the application interface(s) 122 may provide the input data to one or more corresponding user input elements of the application instance(s) 120 to control one or more aspects of the application instance(s) 120.

The input interface(s) 112 may be destructed and/or deactivated using various possible approaches. For example, once the input interface(s) 112 has been presented, a user input(s) to the input interface(s) 112, such as to an interface element 212, may cause the input interface(s) 112 to be dismissed and/or deactivated. As another example, a user input(s) outside of the input interface(s) 112 (e.g., based at least on the user input(s) being within the region 208 or otherwise) may cause the input interface(s) 112 to be dismissed and/or deactivated.

In one or more embodiments, any of the various information specifying and/or indicating one or more interaction areas and/or one or more parameters thereof may be determined by one or more the application instance(s) 120 and/or the application interface(s) 122. Further, any of the various information may be added to the application data by one or more the application instance(s) 120 and/or the application interface(s) 122. For example, the application instance(s) 120 may designate one or more interaction areas and/or parameters thereof using one or more API calls to the application interface(s) 122. The application interface(s) 122 may forward the information to the application(s) 110. Additionally, or alternatively, the application interface(s) 122 may analyze one or more frames of the application instance(s) 120, monitor user input to the application instance(s) 120, and/or monitor runtime data of the application instance(s) 120 to determine one or more interaction areas and/or parameters thereof. For example, the application interface(s) 122 may use the analysis to detect and/or identify one or more interface elements represented in the video and/or changes thereto so as to determine and/or update one or more interaction areas and/or parameters thereof. Additionally, or alternatively, the application interface(s) 122 may receive configuration data for the application instance(s) 120 (from an application instance 120, from the data store 126, from a source external to the server 104, etc.) that defines the one or more interaction areas and/or parameters thereof and include the corresponding data in the application data.

Figure 3:
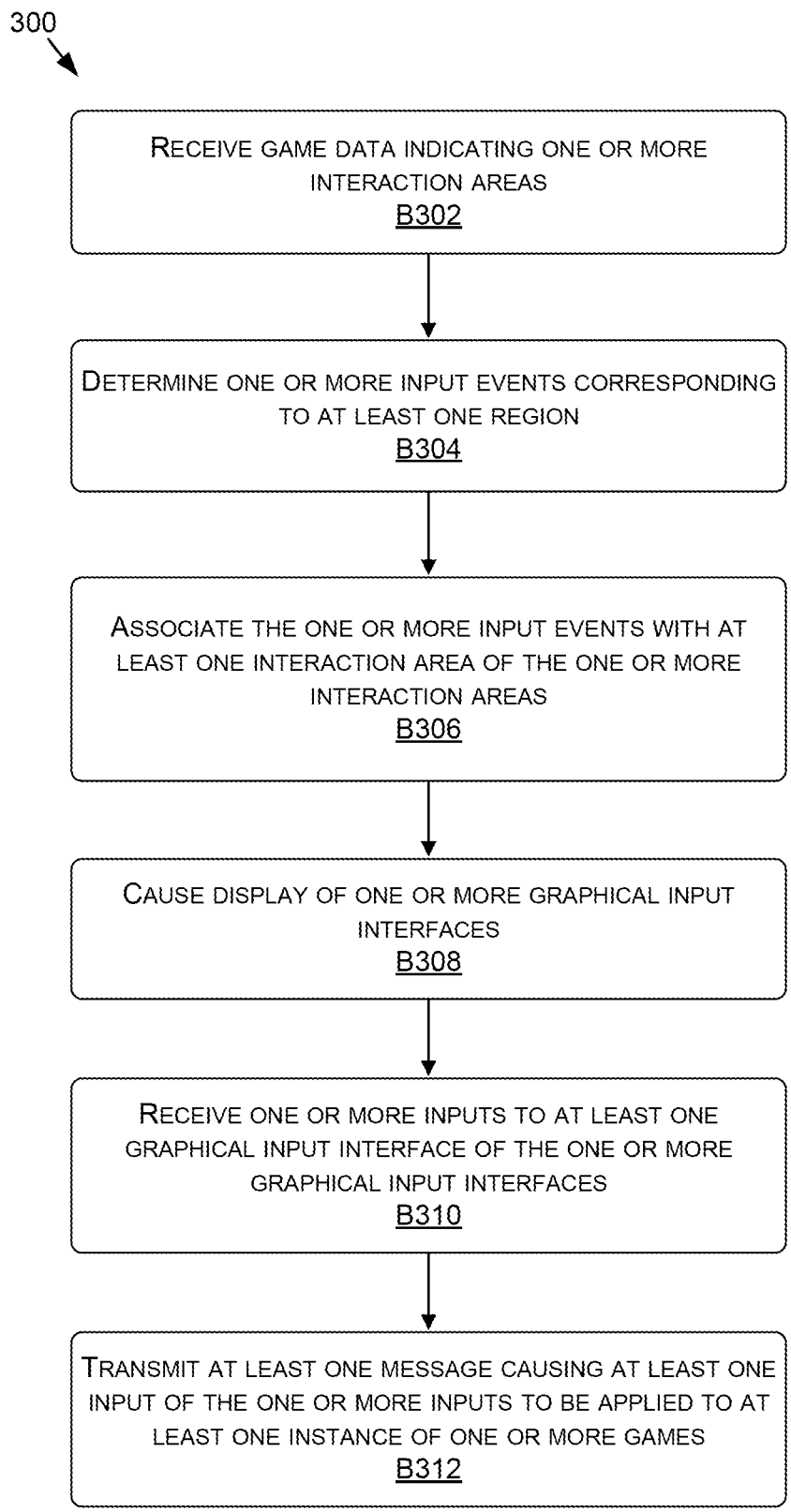
FIG. 3 is a flow diagram showing a method for automatic instantiation of a native virtual interface in a game instance, in accordance with some embodiments of the present disclosure.
Figure 4:
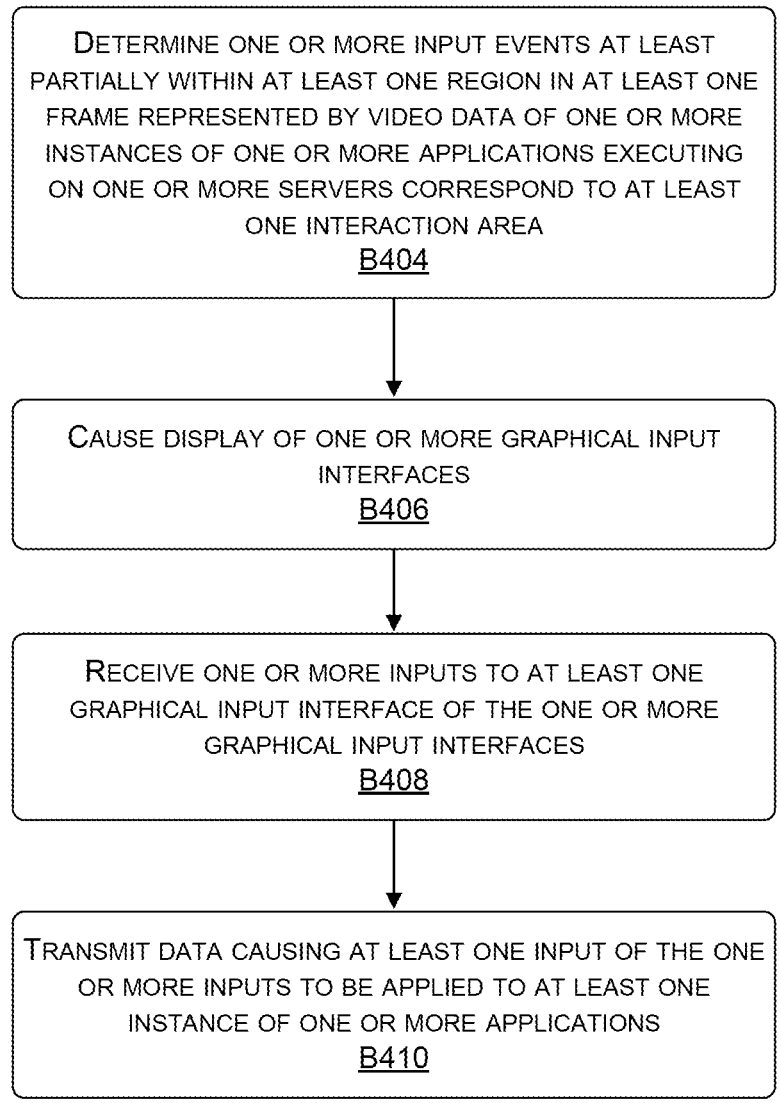
FIG. 4 is a flow diagram showing a method for automatic instantiation of a native virtual interface in an application instance, in accordance with some embodiments of the present disclosure.

Now referring to FIGS. 3-4, each block of methods 300 and 400, and other methods described herein, comprise a computing process that may be performed using any combination of hardware, firmware, and/or software. For instance, various functions may be carried out by a processor executing instructions stored in memory. A method may also be embodied as computer-usable instructions stored on computer storage media. A method may be provided by a standalone application, a service or hosted service (standalone or in combination with another hosted service), or a plug-in to another product, to name a few. In addition, the methods 300 and 400 are described, by way of example, with respect to the system of FIG. 1. However, the methods may additionally or alternatively be executed by any one system, or any combination of systems, including, but not limited to, those described herein.

FIG. 3 is a flow diagram showing a method 300 for automatic instantiation of a native virtual interface in a game instance, in accordance with some embodiments of the present disclosure. The method 300, at block B302 includes receiving game data indicating one or more interaction areas. For example, the application 110 may receive from the server(s) 104 executing the application instance(s) 120, game data indicating one or more interaction areas corresponding to one or more regions in at least one frame of one or more video streams of the application instance(s) 120.

The method 300, at block B304, includes determine one or more input events correspond to at least one region. For example, the application(s) 110 may determine one or more input events corresponding to the region(s) 208.

The method 300, at block B306, includes associating the one or more input events with at least one interaction area of the one or more interaction areas. For example, the application(s) 110 may associate the one or more input events with at least one interaction area of the one or more interaction areas.

The method 300, at block B308, includes causing display of one or more graphical input interfaces. For example, the application(s) 110 may, based at least on the one or more input events being associated with the at least one interaction area, cause display of the input interface(s) 112 using the client device(s) 102.

The method 300, at block B310, includes receiving one or more inputs to at least one graphical input interface of the one or more graphical input interfaces. For example, the application(s) 110 may receive one or more inputs to the input interface(s) 112.

The method 300, at block B312, includes transmitting at least one message causing at least one input of the one or more inputs to be applied to at least one instance of one or more games. For example, the application(s) 110 may transmit at least one message causing at least one input of the one or more inputs to be applied to the application instance(s) 120.

FIG. 4 is a flow diagram showing a method 400 for automatic instantiation of a native virtual interface in an application instance, in accordance with some embodiments of the present disclosure. The method 400, at block B402 includes determining one or more input events at least partially within at least one region in at least one frame represented by video data of one or more instances of one or more applications executing on one or more servers correspond to at least one interaction area. For example, the application(s) 110 may determine one or more input events at least partially within the region(s) 208 in the frame(s) 210 represented by video data of the application instance(s) 120 executing on the server(s) 104 correspond to at least one interaction area.

The method 400, at block B404, includes causing display of one or more graphical input interfaces. For example, the application(s) 110 may, based at least on the one or more input events corresponding to the at least one interaction area, cause display of the input interface(s) 112 using the client device(s) 102.

The method 400, at block B406, includes receiving one or more inputs to at least one graphical input interface of the one or more graphical input interfaces. For example, the application(s) 110 may receive one or more inputs to the input interface(s) 112.

The method 400, at block B408, includes transmitting data causing at least one input of the one or more inputs to be applied to at least one instance of one or more application instances. For example, the application(s) 110 may transmit data causing at least one input of the one or more inputs to be applied to the application instance(s) 120.

Example Content Streaming System

Now referring to FIG. 5, FIG. 5 is an example system diagram for a content streaming system 500, in accordance with some embodiments of the present disclosure. FIG. 5 includes application server(s) 502 (which may include similar components, features, and/or functionality to the example computing device 600 of FIG. 6), client device(s) 504 (which may include similar components, features, and/or functionality to the example computing device 600 of FIG. 6), and network(s) 506 (which may be similar to the network(s) described herein). In some embodiments of the present disclosure, the system 500 may be implemented. The application session may correspond to a game streaming application (e.g., NVIDIA GeForce NOW), a remote desktop application, a simulation application (e.g., autonomous or semi-autonomous vehicle simulation), computer aided design (CAD) applications, virtual reality (VR), augmented reality (AR), and/or mixed reality (MR) streaming applications, deep learning applications, and/or other application types.

In the system 500, for an application session, the client device(s) 504 may only receive input data in response to inputs to the input device(s), transmit the input data to the application server(s) 502, receive encoded display data from the application server(s) 502, and display the display data on the display 524. As such, the more computationally intense computing and processing is offloaded to the application server(s) 502 (e.g., rendering—in particular ray or path tracing—for graphical output of the application session is executed by the GPU(s) of the game server(s) 502). In other words, the application session is streamed to the client device(s) 504 from the application server(s) 502, thereby reducing the requirements of the client device(s) 504 for graphics processing and rendering.

For example, with respect to an instantiation of an application session, a client device 504 may be displaying a frame of the application session on the display 524 based on receiving the display data from the application server(s) 502. The client device 504 may receive an input to one of the input device(s) and generate input data in response. The client device 504 may transmit the input data to the application server(s) 502 via the communication interface 520 and over the network(s) 506 (e.g., the Internet), and the application server(s) 502 may receive the input data via the communication interface 518. The CPU(s) may receive the input data, process the input data, and transmit data to the GPU(s) that causes the GPU(s) to generate a rendering of the application session. For example, the input data may be representative of a movement of a character of the user in a game session of a game application, firing a weapon, reloading, passing a ball, turning a vehicle, etc. The rendering component 512 may render the application session (e.g., representative of the result of the input data) and the render capture component 514 may capture the rendering of the application session as display data (e.g., as image data capturing the rendered frame of the application session). The rendering of the application session may include ray or path-traced lighting and/or shadow effects, computed using one or more parallel processing units—such as GPUs, which may further employ the use of one or more dedicated hardware accelerators or processing cores to perform ray or path-tracing techniques—of the application server(s) 502. In some embodiments, one or more virtual machines (VMs)—e.g., including one or more virtual components, such as vGPUs, vCPUs, etc.—may be used by the application server(s) 502 to support the application sessions. The encoder 516 may then encode the display data to generate encoded display data and the encoded display data may be transmitted to the client device 504 over the network(s) 506 via the communication interface 518. The client device 504 may receive the encoded display data via the communication interface 520 and the decoder 522 may decode the encoded display data to generate the display data. The client device 504 may then display the display data via the display 524.

Example Computing Device

Figure 6:
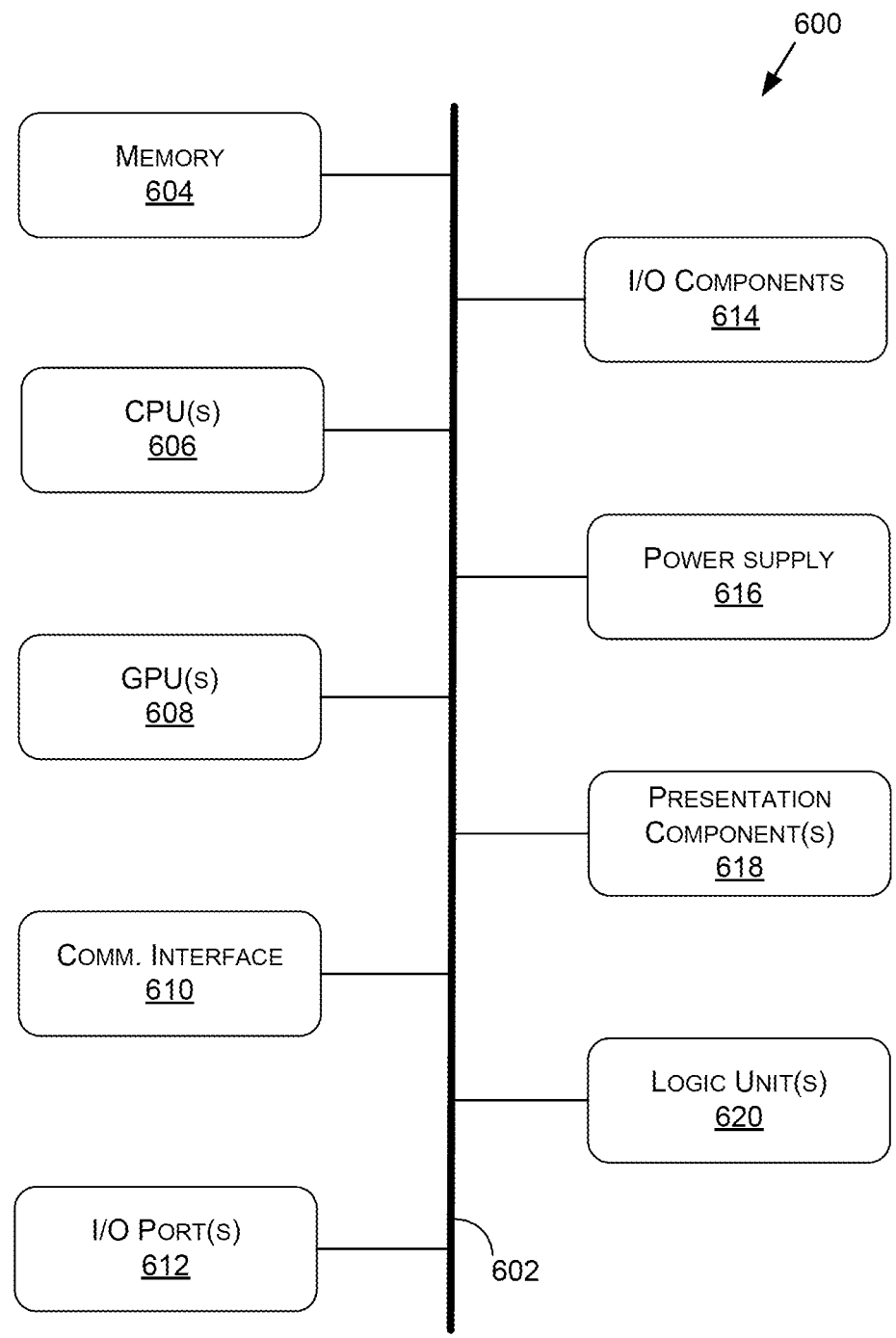
FIG. 6 is a block diagram of an example computing device suitable for use in implementing some embodiments of the present disclosure.

FIG. 6 is a block diagram of an example computing device(s) 600 suitable for use in implementing some embodiments of the present disclosure. Computing device 600 may include an interconnect system 602 that directly or indirectly couples the following devices: memory 604, one or more central processing units (CPUs) 606, one or more graphics processing units (GPUs) 608, a communication interface 610, input/output (I/O) ports 612, input/output components 614, a power supply 616, one or more presentation components 618 (e.g., display(s)), and one or more logic units 620. In at least one embodiment, the computing device(s) 600 may comprise one or more virtual machines (VMs), and/or any of the components thereof may comprise virtual components (e.g., virtual hardware components). For non-limiting examples, one or more of the GPUs 608 may comprise one or more vGPUs, one or more of the CPUs 606 may comprise one or more vCPUs, and/or one or more of the logic units 620 may comprise one or more virtual logic units. As such, a computing device(s) 600 may include discrete components (e.g., a full GPU dedicated to the computing device 600), virtual components (e.g., a portion of a GPU dedicated to the computing device 600), or a combination thereof.

Although the various blocks of FIG. 6 are shown as connected via the interconnect system 602 with lines, this is not intended to be limiting and is for clarity only. For example, in some embodiments, a presentation component 618, such as a display device, may be considered an I/O component 614 (e.g., if the display is a touch screen). As another example, the CPUs 606 and/or GPUs 608 may include memory (e.g., the memory 604 may be representative of a storage device in addition to the memory of the GPUs 608, the CPUs 606, and/or other components). In other words, the computing device of FIG. 6 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 6.

The interconnect system 602 may represent one or more links or busses, such as an address bus, a data bus, a control bus, or a combination thereof. The interconnect system 602 may include one or more bus or link types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus or link. In some embodiments, there are direct connections between components. As an example, the CPU 606 may be directly connected to the memory 604. Further, the CPU 606 may be directly connected to the GPU 608. Where there is direct, or point-to-point connection between components, the interconnect system 602 may include a PCIe link to carry out the connection. In these examples, a PCI bus need not be included in the computing device 600.

The memory 604 may include any of a variety of computer-readable media. The computer-readable media may be any available media that may be accessed by the computing device 600. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 604 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 600. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 606 may be configured to execute at least some of the computer-readable instructions to control one or more components of the computing device 600 to perform one or more of the methods and/or processes described herein. The CPU(s) 606 may each include one or more cores (e.g., one, two, four, eight, twenty-eight, seventy-two, etc.) that are capable of handling a multitude of software threads simultaneously. The CPU(s) 606 may include any type of processor, and may include different types of processors depending on the type of computing device 600 implemented (e.g., processors with fewer cores for mobile devices and processors with more cores for servers). For example, depending on the type of computing device 600, the processor may be an Advanced RISC Machines (ARM) processor implemented using Reduced Instruction Set Computing (RISC) or an x86 processor implemented using Complex Instruction Set Computing (CISC). The computing device 600 may include one or more CPUs 606 in addition to one or more microprocessors or supplementary co-processors, such as math co-processors.

In addition to or alternatively from the CPU(s) 606, the GPU(s) 608 may be configured to execute at least some of the computer-readable instructions to control one or more components of the computing device 600 to perform one or more of the methods and/or processes described herein. One or more of the GPU(s) 608 may be an integrated GPU (e.g., with one or more of the CPU(s) 606 and/or one or more of the GPU(s) 608 may be a discrete GPU. In embodiments, one or more of the GPU(s) 608 may be a coprocessor of one or more of the CPU(s) 606. The GPU(s) 608 may be used by the computing device 600 to render graphics (e.g., 3D graphics) or perform general purpose computations. For example, the GPU(s) 608 may be used for General-Purpose computing on GPUs (GPGPU). The GPU(s) 608 may include hundreds or thousands of cores that are capable of handling hundreds or thousands of software threads simultaneously. The GPU(s) 608 may generate pixel data for output images in response to rendering commands (e.g., rendering commands from the CPU(s) 606 received via a host interface). The GPU(s) 608 may include graphics memory, such as display memory, for storing pixel data or any other suitable data, such as GPGPU data. The display memory may be included as part of the memory 604. The GPU(s) 608 may include two or more GPUs operating in parallel (e.g., via a link). The link may directly connect the GPUs (e.g., using NVLINK) or may connect the GPUs through a switch (e.g., using NVSwitch). When combined together, each GPU 608 may generate pixel data or GPGPU data for different portions of an output or for different outputs (e.g., a first GPU for a first image and a second GPU for a second image). Each GPU may include its own memory, or may share memory with other GPUs.

In addition to or alternatively from the CPU(s) 606 and/or the GPU(s) 608, the logic unit(s) 620 may be configured to execute at least some of the computer-readable instructions to control one or more components of the computing device 600 to perform one or more of the methods and/or processes described herein. In embodiments, the CPU(s) 606, the GPU(s) 608, and/or the logic unit(s) 620 may discretely or jointly perform any combination of the methods, processes and/or portions thereof. One or more of the logic units 620 may be part of and/or integrated in one or more of the CPU(s) 606 and/or the GPU(s) 608 and/or one or more of the logic units 620 may be discrete components or otherwise external to the CPU(s) 606 and/or the GPU(s) 608. In embodiments, one or more of the logic units 620 may be a coprocessor of one or more of the CPU(s) 606 and/or one or more of the GPU(s) 608.

Examples of the logic unit(s) 620 include one or more processing cores and/or components thereof, such as Data Processing Units (DPUs), Tensor Cores (TCs), Tensor Processing Units (TPUs), Pixel Visual Cores (PVCs), Vision Processing Units (VPUs), Graphics Processing Clusters (GPCs), Texture Processing Clusters (TPCs), Streaming Multiprocessors (SMs), Tree Traversal Units (TTUs), Artificial Intelligence Accelerators (AIAs), Deep Learning Accelerators (DLAs), Arithmetic-Logic Units (ALUs), Application-Specific Integrated Circuits (ASICs), Floating Point Units (FPUs), input/output (I/O) elements, peripheral component interconnect (PCI) or peripheral component interconnect express (PCIe) elements, and/or the like.

The communication interface 610 may include one or more receivers, transmitters, and/or transceivers that enable the computing device 600 to communicate with other computing devices via an electronic communication network, included wired and/or wireless communications. The communication interface 610 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet or InfiniBand), low-power wide-area networks (e.g., LoRaWAN, SigFox, etc.), and/or the Internet. In one or more embodiments, logic unit(s) 620 and/or communication interface 610 may include one or more data processing units (DPUs) to transmit data received over a network and/or through interconnect system 602 directly to (e.g., a memory of) one or more GPU(s) 608.

The I/O ports 612 may enable the computing device 600 to be logically coupled to other devices including the I/O components 614, the presentation component(s) 618, and/or other components, some of which may be built in to (e.g., integrated in) the computing device 600. Illustrative I/O components 614 include a microphone, mouse, keyboard, joystick, game pad, game controller, satellite dish, scanner, printer, wireless device, etc. The I/O components 614 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 600. The computing device 600 may be include depth cameras, such as stereoscopic camera systems, infrared camera systems, RGB camera systems, touchscreen technology, and combinations of these, for gesture detection and recognition. Additionally, the computing device 600 may include accelerometers or gyroscopes (e.g., as part of an inertia measurement unit (IMU)) that enable detection of motion. In some examples, the output of the accelerometers or gyroscopes may be used by the computing device 600 to render immersive augmented reality or virtual reality.

The power supply 616 may include a hard-wired power supply, a battery power supply, or a combination thereof. The power supply 616 may provide power to the computing device 600 to enable the components of the computing device 600 to operate.

The presentation component(s) 618 may include a display (e.g., a monitor, a touch screen, a television screen, a heads-up-display (HUD), other display types, or a combination thereof), speakers, and/or other presentation components. The presentation component(s) 618 may receive data from other components (e.g., the GPU(s) 608, the CPU(s) 606, DPUs, etc.), and output the data (e.g., as an image, video, sound, etc.).

Example Data Center

Figure 7:
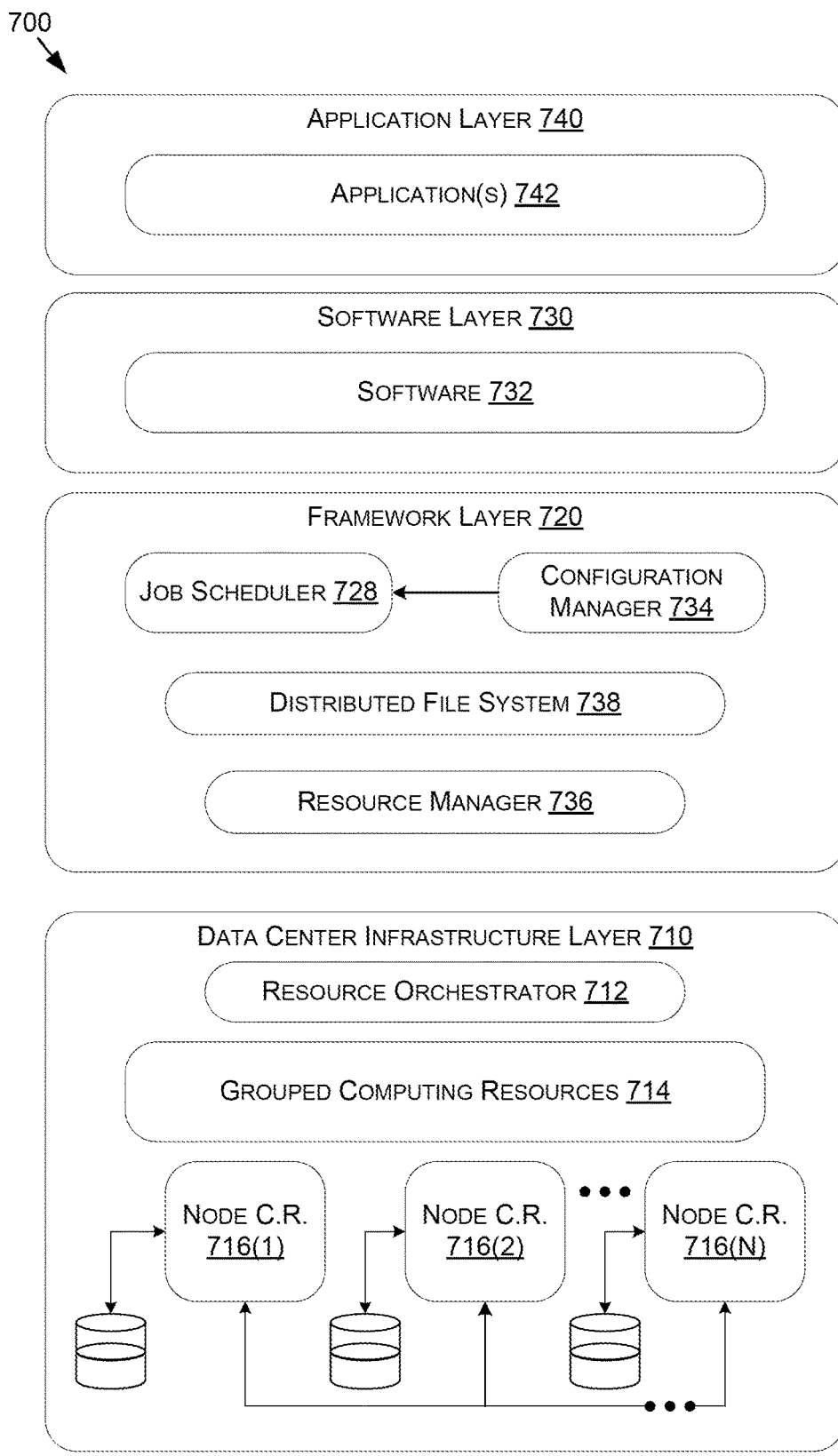
FIG. 7 is a block diagram of an example data center suitable for use in implementing some embodiments of the present disclosure.

FIG. 7 illustrates an example data center 700 that may be used in at least one embodiments of the present disclosure. The data center 700 may include a data center infrastructure layer 710, a framework layer 720, a software layer 730, and/or an application layer 740.

As shown in FIG. 7, the data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units (CPUs) or other processors (including DPUs, accelerators, field programmable gate arrays (FPGAs), graphics processors or graphics processing units (GPUs), etc.), memory devices (e.g., dynamic read-only memory), storage devices (e.g., solid state or disk drives), network input/output (NW I/O) devices, network switches, virtual machines (VMs), power modules, and/or cooling modules, etc. In some embodiments, one or more node C.R.s from among node C.R.s 716(1)-716(N) may correspond to a server having one or more of the above-mentioned computing resources. In addition, in some embodiments, the node C.R.s 716(1)-7161(N) may include one or more virtual components, such as vGPUs, vCPUs, and/or the like, and/or one or more of the node C.R.s 716(1)-716(N) may correspond to a virtual machine (VM).

In at least one embodiment, grouped computing resources 714 may include separate groupings of node C.R.s 716 housed within one or more racks (not shown), or many racks housed in data centers at various geographical locations (also not shown). Separate groupings of node C.R.s 716 within grouped computing resources 714 may include grouped compute, network, memory or storage resources that may be configured or allocated to support one or more workloads. In at least one embodiment, several node C.R.s 716 including CPUs, GPUs, DPUs, and/or other processors may be grouped within one or more racks to provide compute resources to support one or more workloads. The one or more racks may also include any number of power modules, cooling modules, and/or network switches, in any combination.

The resource orchestrator 712 may configure or otherwise control one or more node C.R.s 716(1)-716(N) and/or grouped computing resources 714. In at least one embodiment, resource orchestrator 712 may include a software design infrastructure (SDI) management entity for the data center 700. The resource orchestrator 712 may include hardware, software, or some combination thereof.

In at least one embodiment, as shown in FIG. 7, framework layer 720 may include a job scheduler 728, a configuration manager 734, a resource manager 736, and/or a distributed file system 738. The framework layer 720 may include a framework to support software 732 of software layer 730 and/or one or more application(s) 742 of application layer 740. The software 732 or application(s) 742 may respectively include web-based service software or applications, such as those provided by Amazon Web Services, Google Cloud and Microsoft Azure. The framework layer 720 may be, but is not limited to, a type of free and open-source software web application framework such as Apache Spark™ (hereinafter "Spark") that may utilize distributed file system 738 for large-scale data processing (e.g., "big data"). In at least one embodiment, job scheduler 728 may include a Spark driver to facilitate scheduling of workloads supported by various layers of data center 700. The configuration manager 734 may be capable of configuring different layers such as software layer 730 and framework layer 720 including Spark and distributed file system 738 for supporting large-scale data processing. The resource manager 736 may be capable of managing clustered or grouped computing resources mapped to or allocated for support of distributed file system 738 and job scheduler 728.

In at least one embodiment, clustered or grouped computing resources may include grouped computing resource 714 at data center infrastructure layer 710. The resource manager 736 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 738 of framework layer 720. One or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 738 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.), and/or other machine learning applications used in conjunction with one or more embodiments.

In at least one embodiment, any of configuration manager 734, resource manager 736, and resource orchestrator 712 may implement any number and type of self-modifying actions based on any amount and type of data acquired in any technically feasible fashion. Self-modifying actions may relieve a data center operator of data center 700 from making possibly bad configuration decisions and possibly avoiding underutilized and/or poor performing portions of a data center.

The data center 700 may include tools, services, software or other resources to train one or more machine learning models or predict or infer information using one or more machine learning models according to one or more embodiments described herein. For example, a machine learning model(s) may be trained by calculating weight parameters according to a neural network architecture using software and/or computing resources described above with respect to the data center 700. In at least one embodiment, trained or deployed machine learning models corresponding to one or more neural networks may be used to infer or predict information using resources described above with respect to the data center 700 by using weight parameters calculated through one or more training techniques, such as but not limited to those described herein.

In at least one embodiment, the data center 700 may use CPUs, application-specific integrated circuits (ASICs), GPUs, FPGAs, and/or other hardware (or virtual compute resources corresponding thereto) to perform training and/or inferencing using above-described resources. Moreover, one or more software and/or hardware resources described above may be configured as a service to allow users to train or performing inferencing of information, such as image recognition, speech recognition, or other artificial intelligence services.

Example Network Environments

Network environments suitable for use in implementing embodiments of the disclosure may include one or more client devices, servers, network attached storage (NAS), other backend devices, and/or other device types. The client devices, servers, and/or other device types (e.g., each device) may be implemented on one or more instances of the computing device(s) 600 of FIG. 6—e.g., each device may include similar components, features, and/or functionality of the computing device(s) 600. In addition, where backend devices (e.g., servers, NAS, etc.) are implemented, the backend devices may be included as part of a data center 700, an example of which is described in more detail herein with respect to FIG. 7.

Components of a network environment may communicate with each other via a network(s), which may be wired, wireless, or both. The network may include multiple networks, or a network of networks. By way of example, the network may include one or more Wide Area Networks (WANs), one or more Local Area Networks (LANs), one or more public networks such as the Internet and/or a public switched telephone network (PSTN), and/or one or more private networks. Where the network includes a wireless telecommunications network, components such as a base station, a communications tower, or even access points (as well as other components) may provide wireless connectivity.

Compatible network environments may include one or more peer-to-peer network environments—in which case a server may not be included in a network environment—and one or more client-server network environments—in which case one or more servers may be included in a network environment. In peer-to-peer network environments, functionality described herein with respect to a server(s) may be implemented on any number of client devices.

In at least one embodiment, a network environment may include one or more cloud-based network environments, a distributed computing environment, a combination thereof, etc. A cloud-based network environment may include a framework layer, a job scheduler, a resource manager, and a distributed file system implemented on one or more of servers, which may include one or more core network servers and/or edge servers. A framework layer may include a framework to support software of a software layer and/or one or more application(s) of an application layer. The software or application(s) may respectively include web-based service software or applications. In embodiments, one or more of the client devices may use the web-based service software or applications (e.g., by accessing the service software and/or applications via one or more application programming interfaces (APIs)). The framework layer may be, but is not limited to, a type of free and open-source software web application framework such as that may use a distributed file system for large-scale data processing (e.g., "big data").

A cloud-based network environment may provide cloud computing and/or cloud storage that carries out any combination of computing and/or data storage functions described herein (or one or more portions thereof). Any of these various functions may be distributed over multiple locations from central or core servers (e.g., of one or more data centers that may be distributed across a state, a region, a country, the globe, etc.). If a connection to a user (e.g., a client device) is relatively close to an edge server(s), a core server(s) may designate at least a portion of the functionality to the edge server(s). A cloud-based network environment may be private (e.g., limited to a single organization), may be public (e.g., available to many organizations), and/or a combination thereof (e.g., a hybrid cloud environment).

The client device(s) may include at least some of the components, features, and functionality of the example computing device(s) 600 described herein with respect to FIG. 6. By way of example and not limitation, a client device may be embodied as a Personal Computer (PC), a laptop computer, a mobile device, a smartphone, a tablet computer, a smart watch, a wearable computer, a Personal Digital Assistant (PDA), an MP3 player, a virtual reality headset, a Global Positioning System (GPS) or device, a video player, a video camera, a surveillance device or system, a vehicle, a boat, a flying vessel, a virtual machine, a drone, a robot, a handheld communications device, a hospital device, a gaming device or system, an entertainment system, a vehicle computer system, an embedded system controller, a remote control, an appliance, a consumer electronic device, a workstation, an edge device, any combination of these delineated devices, or any other suitable device.

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. At least one processor comprising:
one or more circuits to:
receive, from one or more servers executing one or more instances of one or more software applications, data indicating one or more interaction areas associated with one or more user input elements native to the one or more software applications, the one or more interaction areas corresponding to one or more regions in at least one frame of one or more video streams corresponding to the one or more instances;
determine one or more input events corresponding to at least one region of the one or more regions;

associate the one or more input events with at least one interaction area of the one or more interaction areas;

based at least on the one or more input events being associated with the at least one interaction area, cause display of one or more graphical input interfaces using one or more client devices;

receive one or more inputs to at least one graphical input interface of the one or more graphical input interfaces; and transmit at least one message causing at least one input of the one or more inputs to be applied to the one or more user input elements of at least one instance of the one or more instances based at least on the one or more interaction areas being associated with the one or more user input elements.

2. The at least one processor of claim 1, wherein the at least one interaction area is activated based at least on the one or more user input elements being displayed in the at least one instance of the one or more software applications.

3. The at least one processor of claim 1, wherein the at least one frame includes an output frame of the at least one instance of the one or more software applications, and the at least one instance specifies one or more first locations for the one or more regions based at least on one or more second locations of the one or more user input elements in the output frame.

4. The at least one processor of claim 1, wherein the data indicates at least one of:
one or more positions of the one or more regions; or
one or more dimensions of the one or more regions.

5. The at least one processor of claim 1, wherein the one or more circuits are further to:
determine one or more second input events corresponding to the at least one region of the one or more regions;
associate the one or more second input events with the at least one interaction area; and
based at least on the one or more second input events being associated with the at least one interaction area, cause removal of the at least one graphical input interface from the display using the one or more client devices.

6. The at least one processor of claim 1, wherein causing the display of the one or more graphical input interfaces includes manipulating at least a portion of a presentation of at least one video stream of the one or more video streams to an updated position to cause the at least one region to be unoccluded by the at least one graphical input interface.

7. The at least one processor of claim 1, wherein the one or more user input elements include at least one text entry field depicted in a display of an output frame of the at least one instance of the one or more software applications.

8. The at least one processor of claim 1, wherein the data includes one or more input type parameters corresponding to the at least one interaction area, the one or more input type parameters indicating a selection of the one or more graphical input interfaces from a set of graphical input interfaces for the display.

9. The at least one processor of claim 1, wherein the data includes interaction area state information corresponding to the at least one interaction area, and the causing the display of the one or more graphical input interfaces is further based at least on the interaction area state information indicating the at least one interaction area is active.

10. The at least one processor of claim 1, wherein the processor is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;
a system implemented using an edge device;
a system implemented using a robot;
a system for performing conversational AI operations;
a system for generating synthetic data;
a system for presenting at least one of virtual reality content, augmented reality content, or mixed reality content;
a system incorporating one or more virtual machines (VMs);
a system implemented at least partially in a data center; or
a system implemented at least partially using cloud computing resources.

11. A system comprising:
one or more processors to execute operations including:
determining one or more input events corresponding to a position at least partially within at least one region in at least one frame represented by video data of one or more instances of one or more applications executing on one or more servers correspond one or more interaction areas associated with one or more user input elements native to the one or more applications;

based at least on the one or more input events corresponding to the one or more interaction areas, causing display of one or more graphical input interfaces using one or more client devices;

receiving one or more inputs to at least one graphical input interface of the one or more graphical input interfaces; and transmitting data causing at least one input of the one or more inputs to be applied to the one or more user input elements of at least one instance of the one or more instances based at least on the one or more interaction areas being associated with the one or more user input elements.

12. The system of claim 11, wherein the one or more interaction areas correspond to one or more text entry fields instantiated within the at least one instance of the one or more applications.

13. The system of claim 11, wherein one or more parameters of the one or more interaction areas are specified using the at least one instance of the one or more applications.

14. The system of claim 11, wherein the at least one instance includes an instance of a game application, the video data includes a video stream of a game session of the game application, and the one or more user input elements are used to control the game session.

15. The system of claim 11, wherein the system is comprised in at least one of:
a control system for an autonomous or semi-autonomous machine;
a perception system for an autonomous or semi-autonomous machine;
a system for performing simulation operations;
a system for performing digital twin operations;
a system for performing light transport simulation;
a system for performing collaborative content creation for 3D assets;
a system for performing deep learning operations;

a system implemented using an edge device;
a system implemented using a robot;
a system for performing conversational AI operations;
a system for generating synthetic data;
a system for presenting at least one of virtual reality content, augmented reality content, or mixed reality content;
a system incorporating one or more virtual machines (VMs);
a system implemented at least partially in a data center; or
a system implemented at least partially using cloud computing resources.

16. A method comprising:
causing at least one input generated using at least one native graphical input interface of at least one client device to be applied to one or more user input elements native to at least one instance of one or more applications executing on one or more servers in at least one frame represented by video data of one or more instances of one or more applications based at least on:
determining one or more input events corresponding to a position at least partially within at least one region in at least one frame represented by video data of the at least one instance correspond to at least one interaction area based at least on the one or more user input elements being associated with the one or more applications, and
causing display of the at least one native graphical input interface based at least on the one or more input events corresponding to the at least one interaction area.

17. The method of claim 16, wherein the at least one interaction area corresponds to at least one input field instantiated with the at least one instance of the one or more applications.

18. The method of claim 16, wherein one or more parameters of the at least one interaction area are specified by the at least one instance of the one or more applications.

19. The method of claim 16, wherein the at least one interaction area is specified by the at least one instance of the one or more applications.

20. The method of claim 16, wherein causing the display of the at least one graphical input interface includes manipulating at least a portion of a presentation of at least some of the video data to an updated position to cause the at least one region to be unoccluded by the at least one graphical input interface.

* * * * *